(No Model.)
2 Sheets—Sheet 1.

H. O. PEABODY.
FERTILIZER DISTRIBUTER.

No. 343,193. Patented June 8, 1886.

Witnesses:
Walter E. Lombard.
Geo. E. Mitchell.

Inventor:
Henry O. Peabody,
by N. C. Lombard
Attorney.

(No Model.) 2 Sheets—Sheet 2.

H. O. PEABODY.
FERTILIZER DISTRIBUTER.

No. 343,193. Patented June 8, 1886.

Witnesses:
Walter E. Lombard
Geo. E. Mitchell

Inventor:
Henry O. Peabody,
by N. C. Lombard
Attorney.

UNITED STATES PATENT OFFICE.

HENRY O. PEABODY, OF BOSTON, MASSACHUSETTS.

FERTILIZER-DISTRIBUTER.

SPECIFICATION forming part of Letters Patent No. 343,193, dated June 8, 1886.

Application filed February 6, 1886. Serial No. 191,043. (No model.)

*To all whom it may concern:*

Be it known that I, HENRY O. PEABODY, of Boston, in the county of Suffolk and State of Massachusetts, have invented certain new and useful Improvements in Fertilizer-Distributers, of which the following, taken in connection with the accompanying drawings, is a specification.

My invention relates to machines for spreading or distributing fertilizers of that class which are used in a finely-pulverized condition, and is an improvement on the machine described in Letters Patent No. 320,279, issued to me June 16, 1885; and it consists in certain novel features of construction, arrangement, and combination of parts, which will be readily understood by reference to the description of the drawings, and to the claims to be hereinafter given.

Figure 1:
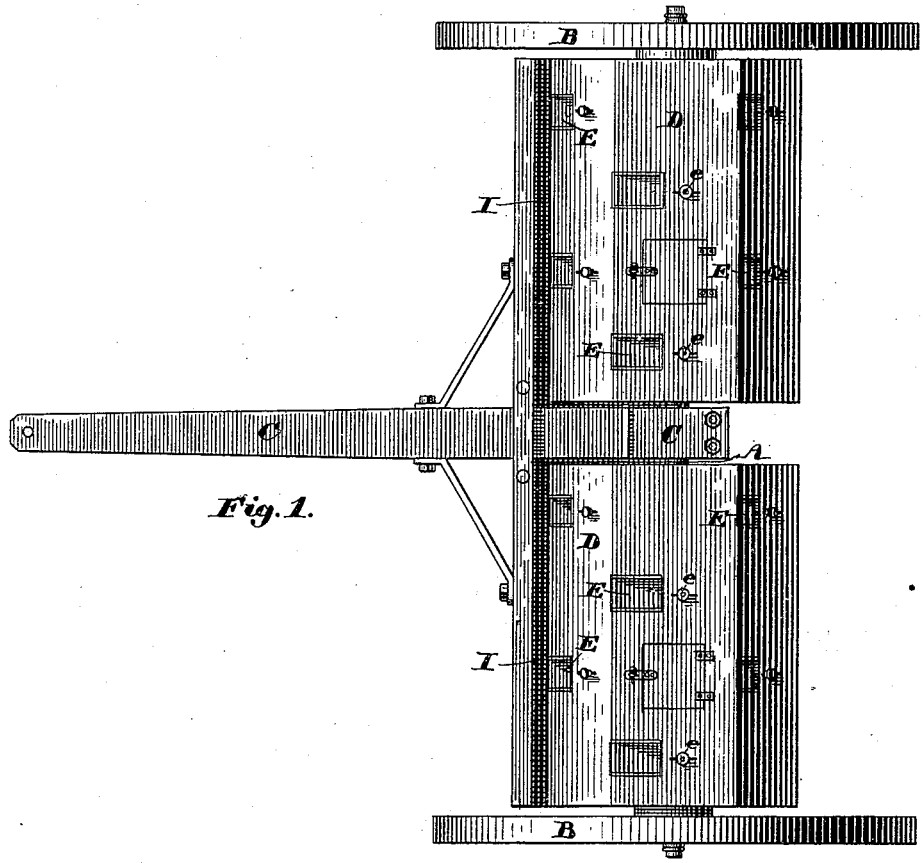
Figure 2:
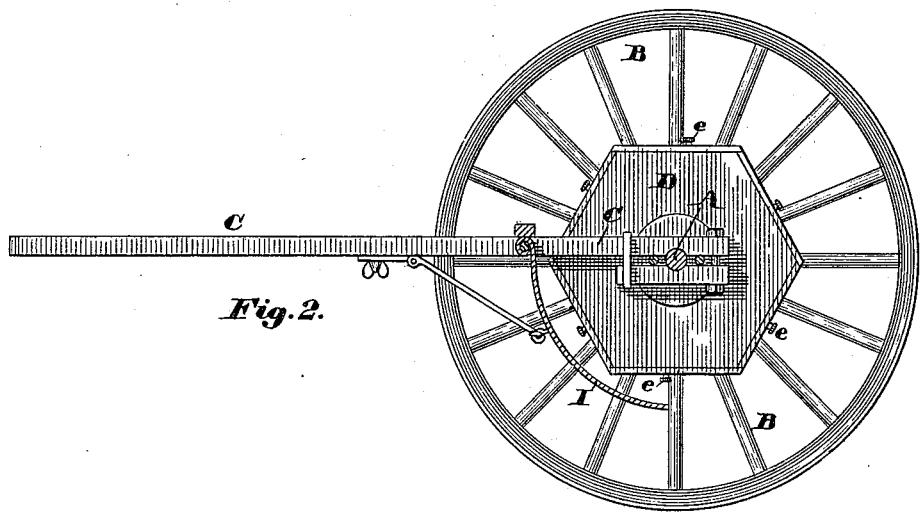
Figure 3:
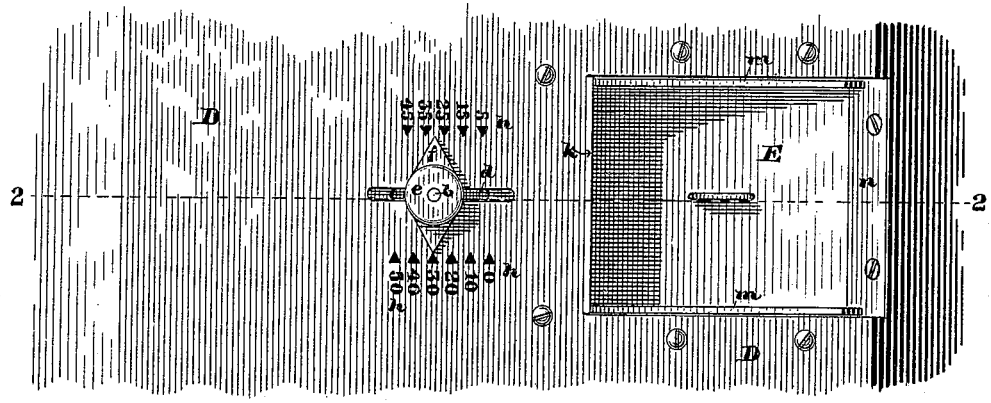
Figure 4:
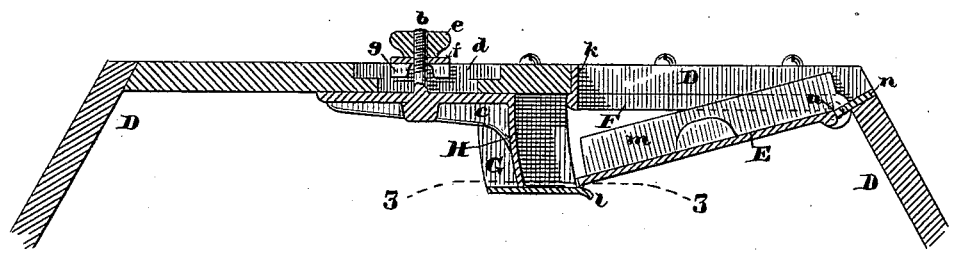
Figure 5:
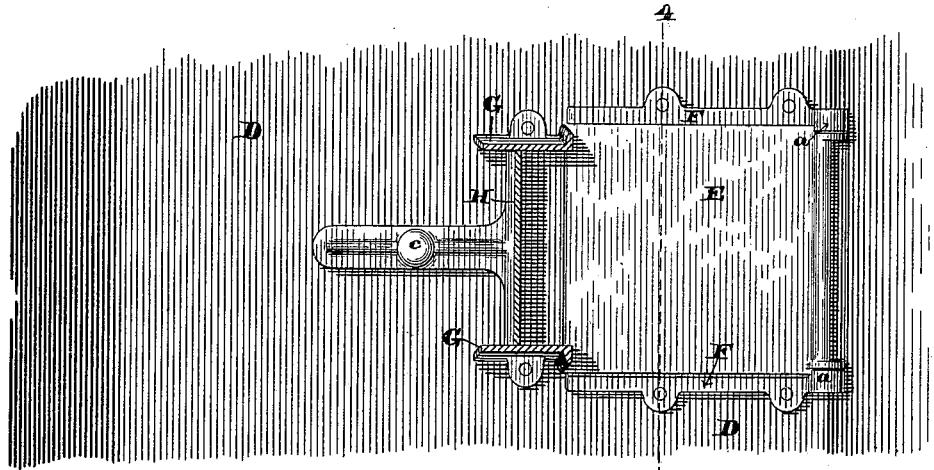
Figure 7:
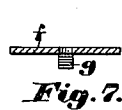
Figure 6:
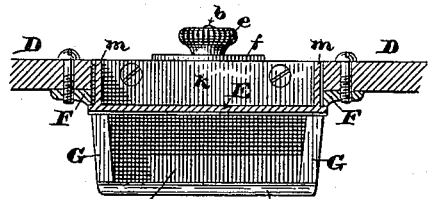

Of the drawings, Figure 1 represents a plan of a machine embodying the principles of my invention. Fig. 2 represents a vertical sectional elevation of the same, the cutting plane being on line 1 1 on Fig. 1. Fig. 3 represents a plan of a portion of one of the fertilizer-holding drums, showing one of the discharge-orifices. Fig. 4 represents a sectional elevation of the same, the cutting plane being on line 2 2 on Fig. 3. Fig. 5 represents an inverted sectional plan of the same, the cutting-plane being on line 3 3 on Fig. 4. Fig. 6 represents a cross-sectional elevation of the same, the cutting-plane being on line 4 4 on Fig. 5, and Figs. 7 and 8 represent details of construction which will be hereinafter referred to.

In the drawings, A is the axle, having mounted upon each end thereof, so as to revolve freely thereon, a wheel, B, and having firmly secured to the middle of its length the perch or pole C.

Figure 8:

Upon the axle A, on either side of the pole C, are loosely mounted the fertilizer-holding drums D D, made, preferably, of wood and hexagonal in cross-section, and each of which has cut through each face of its hexagonal periphery one or more openings contiguous to the angle between two of said faces, into each of which is fitted the gate E, pivoted at $a$, as shown in Fig. 8, to the metal strips F F, secured to the inner side of the drum D and on either side of said openings.

To the inner side of the drum D, at a point just beyond the edge of the gate E, which is opposite its pivot $a$, is secured the hopper or bucket G, which is made open at both ends, and is provided with an independent bottom, H, which nicely fits the interior of said bucket G, and is adapted to be moved therein toward or from the ends of said bucket to vary its capacity in an obvious manner. This adjustment is accomplished by means of the threaded shank $b$, formed upon the arm $c$ of said movable bottom H, which shank passes through the slot $d$, formed in the drum D, and is provided upon its outer end with the thumbnut $e$, by which said movable bottom may be clamped in any desired position.

Upon the shank $b$, beneath the thumb-nut $e$, is placed the double-pointed index $f$, which is provided upon its under side with the wings $g$ $g$, which extend into said slot $d$, to prevent said index from being turned about the shank $b$, while at the same time it is adapted to be moved with said shank toward or from the discharge-orifice in an obvious manner. At either side of said index the surface of the drum D is provided with a suitable scale, $h$, by which, in connection with the said index $f$, the amount of fertilizer to be distributed over a given tract of ground may be readily determined.

To the edge of the orifice which is nearest to the bucket G is secured the metal strip $k$, and upon the edge of this strip and the metal strips F F the gate E rests when in a position to close said discharge-orifice, thereby effectually preventing any leakage of the material while in that position.

The lip $l$, projecting from and forming a part of the bucket G, limits the inward movement of the gate E when said gate is in a position to allow the fertilizer contained in the drum D to be discharged through the opening in said drum, and in this position the material in its passage from the bucket to a point outside of said drum is guided by the upwardly-projecting ribs $m$ $m$ and prevented from falling back into the interior of the drum.

The operation of my invention is as follows:

The amount of fertilizer to be distributed to an acre having been determined, the index-finger *f* is moved opposite the point corresponding with that amount, and the movable bottom H is thereby moved to such a position relative to the bucket G as to allow an amount of fertilizer to be discharged, which multiplied by the total number of discharges made as the machine passed over an acre of ground, would yield the desired quantity. The position of the bottom H having thus been determined, and the drums D D having been partly filled with fertilizer, the said drums are revolved about their axes as they are moved over the ground in the direction indicated by the arrows in Figs. 2 and 4. As said drums revolve about their axes and as the gates E approach a position beneath said axes said gates will drop by their own weight to their lowermost position and close the discharge-orifice, while the buckets G in passing through the material in the drum are completely filled therewith; but as soon as the gates E begin to approach a position above said axes they will assume the position shown in Fig. 4, and as the drum continues to revolve the material in the buckets G will pass over said gates E and be discharged upon the apron I, from which it will fall to the ground. The gate E, in moving from a position in which the discharge-opening is closed to a position in which said opening is open, removes the surplus fertilizer from the bucket, and thus always allows only the required amount to be discharged through the opening.

In order to insure against leakage at the pivotal connection of the gate E to the drum D, the bottom plate of said gate is made to extend directly to the center of said pivotal connection, so that very little movement is given to that end of the gate as it swings about its pivot, at which point it is met by the stationary strip *n*, thus making a substantially tight joint, whether the gate is in an open or a closed position.

The advantages of this discharging device are its durability, its cheapness, and its ready adjustment, while it will never clog up with the fertilizer so as to prevent its working, as has been found to be the case in the devices described by me in my before-mentioned Letters Patent.

What I claim as new, and desire to secure by Letters Patent of the United States, is—

1. In combination with a revolving hollow fertilizer-holding drum provided with a discharge-opening, a gate or valve mounted upon and movable about a fixed axis to open and close said opening, and a bucket secured in a fixed position within said drum, and having its mouth or discharge end curved to an arc corresponding to and coinciding, or nearly so, with the arc described by the movable end of said gate, substantially as described.

2. In combination with a revolving hollow fertilizer-holding drum provided with a series of discharge-openings, a series of swinging gates arranged to alternately open and close said openings, a series of buckets open at both ends and secured in a fixed position within said drum with their mouths or discharge ends contiguous to the swinging ends of said gates, a series of independent bottoms fitted to and adapted to be moved from end to end of said buckets, and a series of clamping devices for securing said movable bottoms in any desired position.

3. In combination with a revolving hollow fertilizer-holding drum provided with a discharge-opening, a swinging gate arranged to alternately open and close said opening, a bucket secured in a fixed position within said drum with its mouth contiguous to the swinging end of said gate, an independent bottom fitted to and adapted to be moved toward or from the mouth of said bucket, a clamping device for securing said movable bottom in any desired position, an index-finger secured to and movable with said independent bottom, and a scale by which, in conjunction with said finger, the amount of fertilizer to be discharged from said hopper at each revolution of the drum may be readily regulated.

4. In combination with a revolving hollow fertilizer-holding drum provided with a discharge-opening, a bucket secured in a fixed position within said drum at one side of said opening, and having its sides at its open or discharge end curved to an arc of a circle, and a gate mounted upon and movable about a fixed axis located at the opposite side of said opening, and arranged to alternately open and close said opening with its movable end outside of but in close proximity to the curved end of the bucket, and provided with an outwardly-projecting rib extending from its pivotal end to its free or movable end near each edge, and adapted to guide the fertilizer as it passes from the bucket to the outside of the drum and prevent it from re-entering the interior thereof.

5. In combination with a revolving hollow fertilizer-holding drum provided with a discharge-opening, a raised metal seat around three sides of said opening, and projecting inward from the inner face of the drum, a swinging gate or valve mounted upon and movable about a fixed axis to alternately open and close said opening, and to rest upon said seat when closed, and a bucket secured in a fixed position within said drum upon the side of said opening opposite to the pivotal axis of said gate, and having its sides at its discharge end curved to an arc of a circle corresponding to and coinciding, or nearly so, with the arc described by the movable end of said gate, substantially as described.

6. In combination with a revolving hollow fertilizer-holding drum provided with a discharge-opening, a gate or valve mounted upon and movable about a fixed axis to open and close said opening, and a bucket secured in a fixed position within said drum, and having its mouth or discharge end curved to an arc corresponding to and coinciding, or nearly so, with the arc described by the movable end of said gate, and having the plate which forms its inner side prolonged to serve as a step for and to limit the inward movement of said gate.

In testimony whereof I have signed my name to this specification, in the presence of two subscribing witnesses, on this 4th day of February, A. D. 1886.

HENRY O. PEABODY.

Witnesses:
N. C. LOMBARD,
WALTER E. LOMBARD.